United States Patent
Qu

(10) Patent No.: US 7,729,242 B2
(45) Date of Patent: Jun. 1, 2010

(54) 3-LEVEL QUEUING SCHEDULER SUPPORTING FLEXIBLE CONFIGURATION AND ETHERCHANNEL

(75) Inventor: Jian Qu, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 11/933,028

(22) Filed: Dec. 13, 2007

(65) Prior Publication Data

US 2009/0154483 A1    Jun. 18, 2009

(51) Int. Cl.
*H04L 12/56* (2006.01)

(52) U.S. Cl. ................... 370/229; 370/412; 711/117

(58) Field of Classification Search ............ None
See application file for complete search history.

(56) References Cited

U.S. PATENT DOCUMENTS

| | | | | |
|---|---|---|---|---|
| 6,469,983 B2* | 10/2002 | Narayana et al. | ............ | 370/231 |
| 6,922,732 B2* | 7/2005 | Elmaliach et al. | ............ | 709/240 |
| 7,006,513 B1* | 2/2006 | Ali et al. | ............ | 370/414 |
| 7,417,999 B1* | 8/2008 | Charny et al. | ............ | 370/408 |
| 2005/0177644 A1* | 8/2005 | Basso et al. | ............ | 709/232 |
| 2005/0249220 A1* | 11/2005 | Olsen et al. | ............ | 370/395.4 |
| 2006/0029079 A1* | 2/2006 | Cohen et al. | ............ | 370/395.4 |
| 2006/0193256 A1* | 8/2006 | Burns et al. | ............ | 370/230 |
| 2008/0259917 A1* | 10/2008 | Hua et al. | ............ | 370/389 |

OTHER PUBLICATIONS

Cisco Systems, Inc., Data Sheet: Cisco 7600 Series Spa Interface Processor-600, copyright Cisco Systems, Inc. 1992-2005, San Jose, CA.
Cisco Systems, Inc., Solution Overview: the Cisco QuantumFlow Processor: Cisco's Next Generation Network Processor, copyright Cisco Systems, Inc. 2008, San Jose, Ca, down-loaded from the Internet at <http://www.cisco.com/en/US/prod/collateral/routers/ps9343/solution_overview_c22-448936.html>.

* cited by examiner

*Primary Examiner*—Daniel J Ryman
*Assistant Examiner*—Brian Roberts
(74) *Attorney, Agent, or Firm*—Charles E. Krueger

(57) ABSTRACT

In one embodiment, a scheduler for a queue hierarchy only accesses sub-groups of bucket nodes in order to determine the best eligible queue bucket to transmit next. Etherchannel address hashing is performed after scheduling so that an Etherchannel queue including a single queue in the hierarchy is implemented to guarantee quality of service.

13 Claims, 5 Drawing Sheets

3-LEVEL QUEUING SCHEDULER SUPPORTING FLEXIBLE CONFIGURATION AND ETHERCHANNEL

BACKGROUND OF THE INVENTION

A Hierarchical Queuing Framework (HQF) provides a hierarchy of queues used by a network device such as a switch. One type of queue hierarchy includes physical, logical, and class levels of queues.

The physical level of the hierarchy is used for policing or shaping the physical interface and can only be identified by class default. In an example system, the logical level of the hierarchy is classified by VLAN ID. At this level, the classification can match on VLAN tag (802.1Q or Inter-Switch Link [ISL]) or 802.1Q tunnel tags (Q-in-Q). Traffic at the class level of the hierarchy is classified by class of service (CoS), IP Precedence, IP differentiated services code point (DSCP), and MPLS EXP bits.

For example, the three levels of queues include 4096 class level queues, 1024 logical level queues, and 1 physical level queue available on each Enhanced Services port. For each logical level queue, there can be 1 to 8 class level queues. These queues can also be serviced by multiple Quality of Service (QoS) functions such as policing, shaping, and sharing.

EtherChannel allows multiple physical Fast Ethernet links to combine into one logical channel to allow load sharing of traffic among the links in the channel as well as redundancy in the event that one or more links in the channel fail. In order to distribute frames across a channel, EtherChannel uses a hash algorithm to reduce part of the binary pattern formed by the addresses in a frame to a numerical value that selects one of the links in the channel. The hash algorithm computes a value that assigns the channel, the user can not control the channel used by a particular flow.

TECHNICAL FIELD

The present disclosure relates generally to techniques for scheduling transmit queues in a hierarchical queue structure.

DESCRIPTION OF EXAMPLE EMBODIMENTS

Overview

A scheduler determines an updated bin tick value equal to the minimum value of tick values held in an updated group of first level bucket nodes, with the updated group including a first level bucket node having an updated tick value and with a plurality of first level bucket nodes partitioned into first level groups and each first level bucket node holding a tick value and propagates only the updated bin tick value and ID of the first level bucket holding the updated bin tick value to an associated second level bucket node in a plurality of second level bucket nodes, with each second level bucket node in the plurality of second level bucket nodes associated with a unique group of first level bucket nodes, with each second level bucket node holding bin tick value equal to the minimum value of all the tick values held in the associated group of first level bucket nodes and holding an ID value identifying the first level bucket node in the associated group that holds the bin tick value, where the bin tick value and ID value held in the second level bucket node associated with the updated group of first level bucket nodes is replaced by the updated min tick value and the ID value of the first level bucket node holding the updated min tick value.

Description

Reference will now be made in detail to various embodiments of the invention. Examples of these embodiments are illustrated in the accompanying drawings. While the invention will be described in conjunction with these embodiments, it will be understood that it is not intended to limit the invention to any embodiment. On the contrary, it is intended to cover alternatives, modifications, and equivalents as may be included within the spirit and scope of the invention as defined by the appended claims. In the following description, numerous specific details are set forth in order to provide a thorough understanding of the various embodiments. However, the present invention may be practiced without some or all of these specific details. In other instances, well known process operations have not been described in detail in order not to unnecessarily obscure the present invention.

Figure 1:
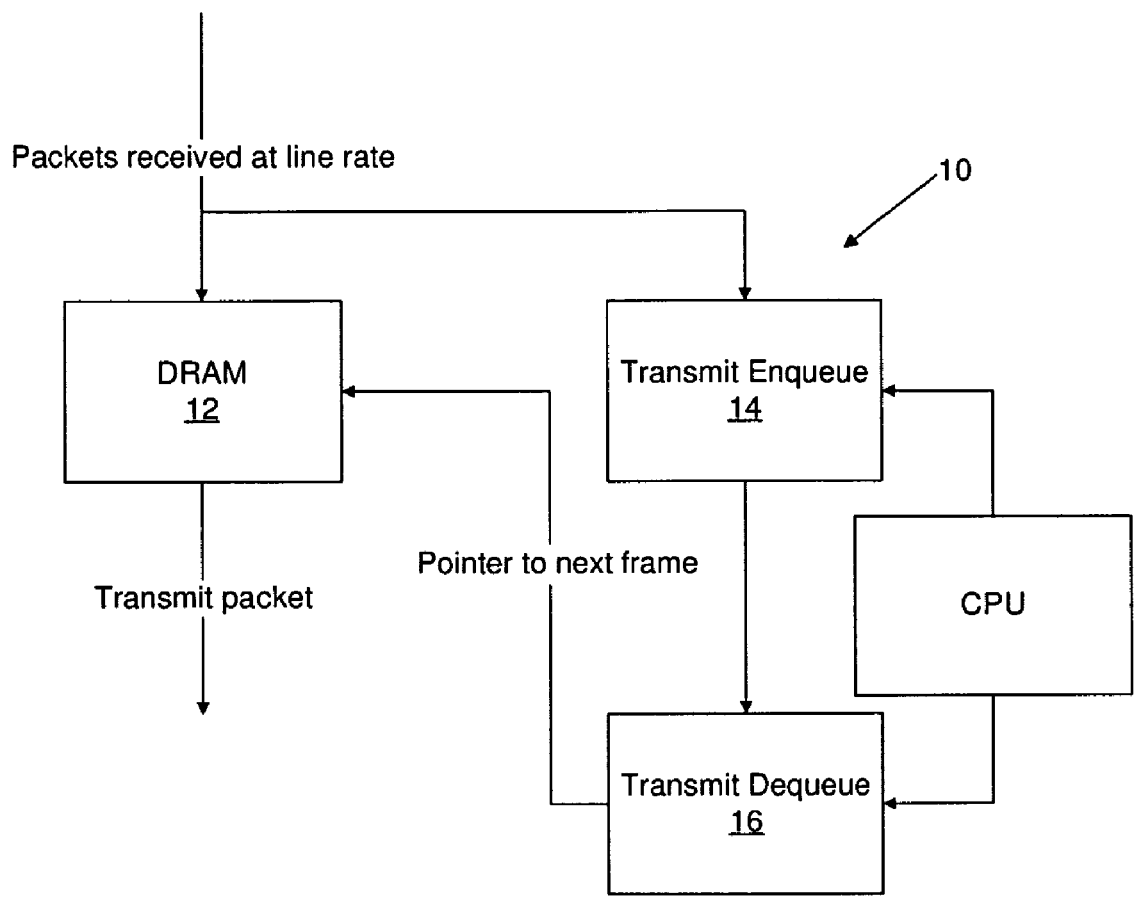
FIG. 1 illustrates an example of a hardware environment suitable for implementing example embodiments.

FIG. 1 depicts an example hardware implementation of a queue 10. In FIG. 1 packets are received at a line rate and stored in memory, in this example a high speed DRAM 12. The packets are also directed to a transmit enqueue 14 that examines the packets and forms queues according to defined rules. The queues include pointers to enqueued packets held in the DRAM 12. A packet transmit dequeue block 16 includes a scheduler that selects the next packet to be transmitted based on selected rules. A pointer to the next packet scheduled to transmit is used to access the packet and output it from the DRAM 12.

Figure 2:
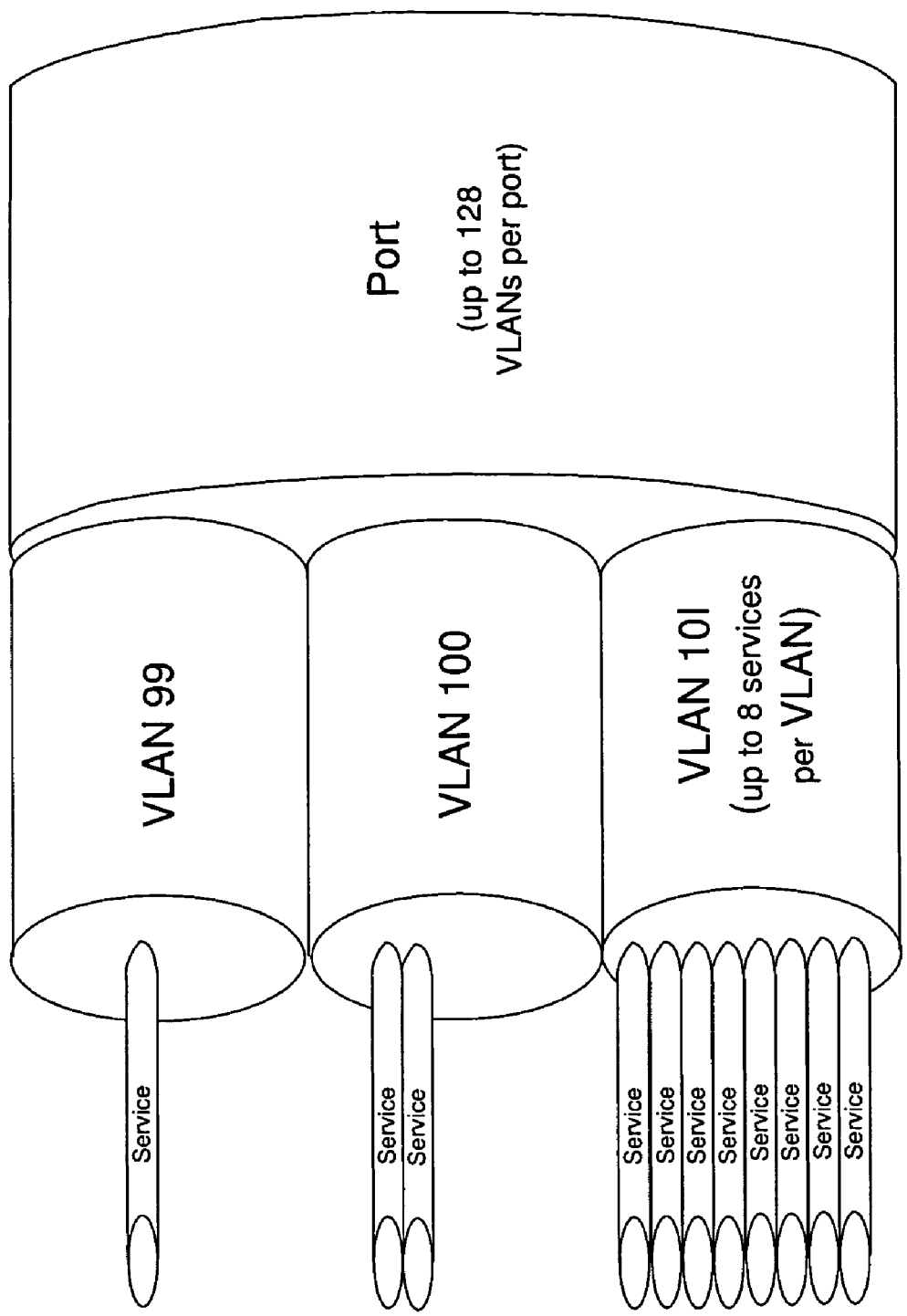
FIG. 2 illustrates an example of a queuing hierarchy.

FIG. 2 depicts an example hierarchical queue structure having 3 levels of queues, including 512 class queues, 128 logical queues and 26 port queues. Each class and logical queue has the following attributes: priority level (0-7), committed rate (bps), peak rate (bps) and burst tolerance(s). A scheduler determines the best queue eligible to transmit based on those attributes.

The queues in a given level can be "attached" to the next level queue via software configuration on-the-fly, without affecting any other queues' configuration. Furthermore, a port queue can be mapped to one or more physical ports. This is to support Etherchannel where a single virtual port queue actually includes multiple physical ports.

An example embodiment of a scheduler will now be described with reference to FIGS. 3-5. In this example the scheduler is based on a token bucket algorithm where there is a bucket for each queue and each bucket holds a tickCount value.

Figure 3:
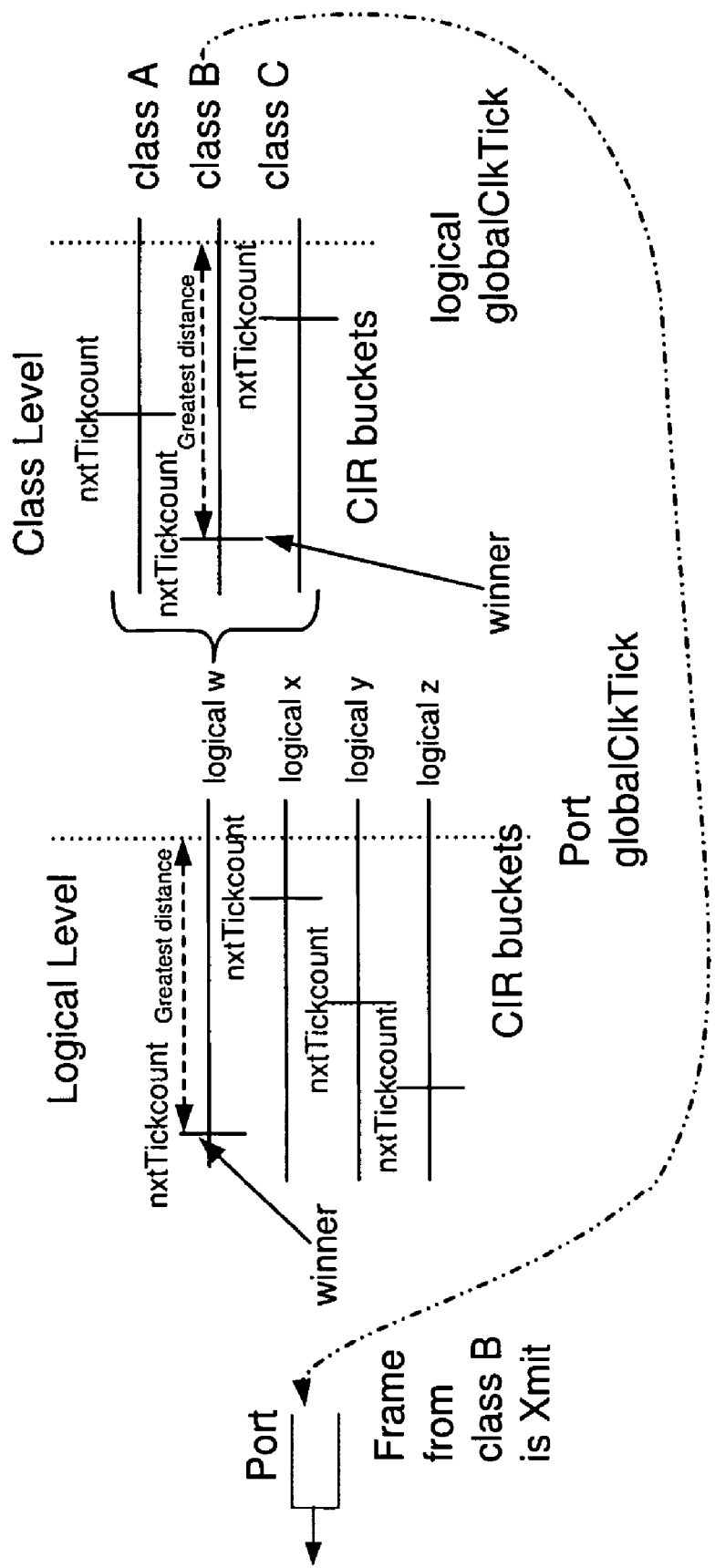
FIG. 3 illustrates an example of a token propagation hierarchy.

FIG. 3 depicts the nxtTickcount values held in token buckets for queues in the Class Level and Logical Level. Each bucket holds a nxtTickcount and the scheduler maintains (a) a logical global clock counter which outputs a logical globalClkTick value and (b) a port global clock counter that outputs a port globalClkTick value.

When a frame is transmitted from a queue, its nxtTickcount value is updated as: nxtTickcount=curTickCount+(Length)

(tickPerByte) where the Length value is equal to the length in bytes of the transmitted frame and the tickPerByte value is equal to the reciprocal of the transmission rate expressed as clock ticks per byte.

For each scheduler cycle, the queue having a bucket holding the smallest tickCount (or equivalently having the greatest distance from the globalClkTick value) will be propagated to the next level.

In FIG. 3, classes A, B and C are included in logical level w and the direction of increasing Tickcount value is to the right. The globalClkTick value moves to the right as time elapses. Accordingly, in this example, the nxtTickcount value of class B is the smallest (has the greatest distance from the logical globalClkTick value) and is selected as the next class level queue to be transmitted in logical level w. Similarly, in this example, the nxtTickcount for logical level w is the smallest (has the greatest distance from the Port globalClkTick value) and is selected as the next logical level queue to have access to the port. As indicated by the arrow 26, the frame of the class B queue is transmitted from the port.

In this example embodiment, from a configuration point of view the design must satisfy the following cases: 1) in the simplest case, a class queue feeds into a logical queue, which is fed into a port queue; 2) in the worst case, up to 8 class queues can feed into a logical queue, and up to 128 logical queues can feed into a port queue; and 3) any combination between (1) and (2), i.e., one port can have 30 logical queues, another port may have 3 logical queues, etc.

In this example there are 512 class queues, 128 logical queues and 26 port queues. Each queue must maintain a corresponding bucket in memory. This is to reduce the memory access needed so that the scheduler does not have to "touch" every queue for each scheduler cycle, as will be described in more detail below.

In this embodiment, for each port queue, there is an identical binary tree structure. Each tree has 4 levels: Root, Branch, Bin and individual LogicalQ bucket nodes. FIG. 4 depicts the Queue Association Binary Tree that schedules a logical queue to transmit a frame from a port. The shaded circles order the steps involved in selecting a best logical queue within a port and are described below.

Figure 4:
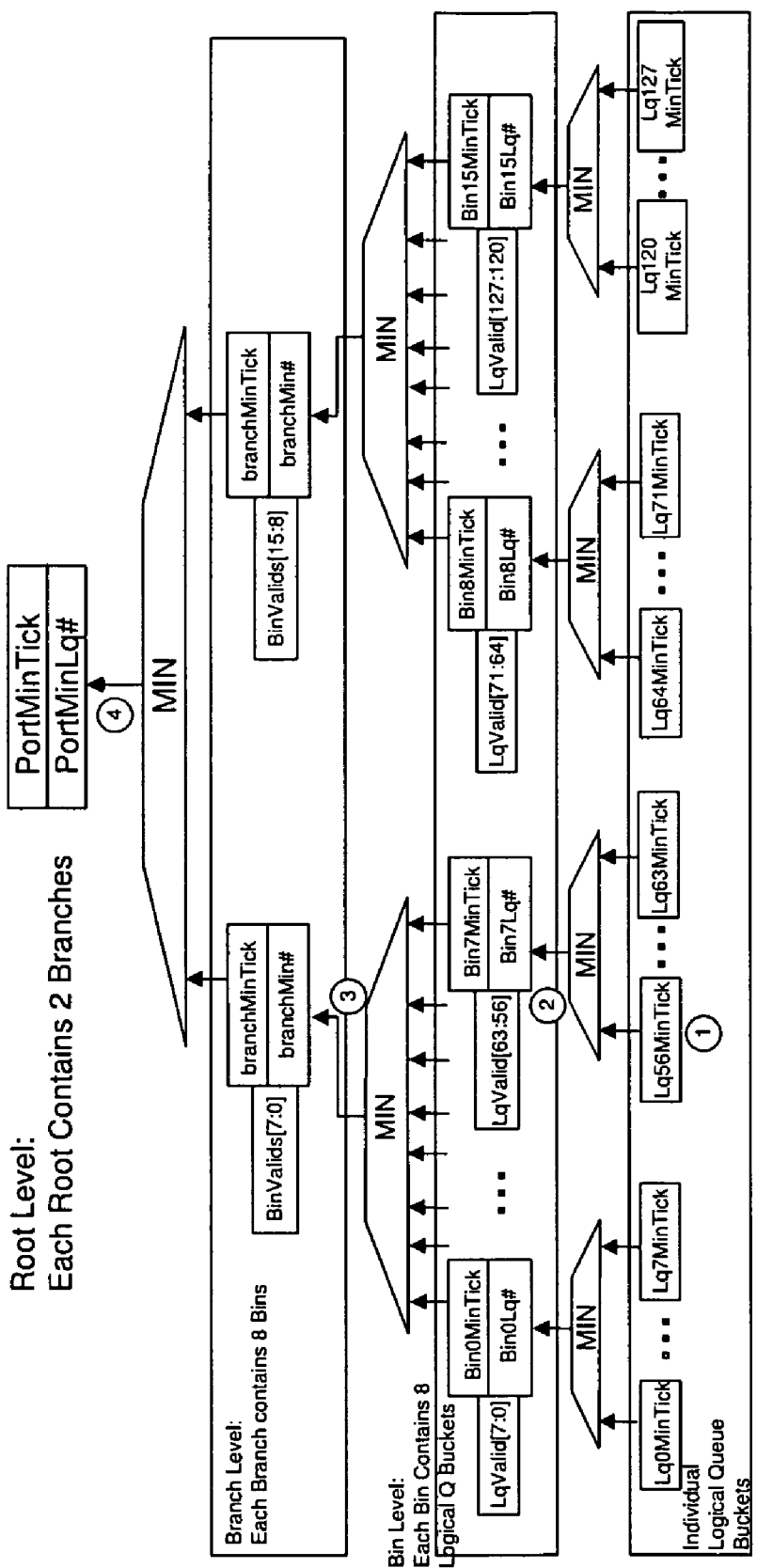
FIG. 4 illustrates an example of a queue association binary tree.

In FIG. 4 the 128 individual logical queue bucket nodes 30 hold the minimum tick values (Lq#MinTick) from their associated class queues. These logical queue bucket nodes are partitioned into groups of eight buckets each, with each group termed logical level adjacent group, with buckets in each logical level adjacent group coupled to inputs of a separate logic level MIN block. As depicted in FIG. 4, each logic level MIN block outputs a Bin#MinTick value equal to the lowest value of the accessed Lq#MinTick values and also outputs a Bin#Lq# value indicating the identity of the logical queue bucket in the associated logical level adjacent group which holds the minimum Lq#MinTick value.

In this example, the outputs of the first eight logical level MIN blocks are held in an adjacent group of BINs, where each BIN holds the Lq#MinTick value output by a coupled logic level MIN block and the identity of the logical queue bucket holding the Lq#MinTick value output by the coupled logical level MIN block.

The first Bin level MIN block outputs a branchMinTick value equal to the minimum Lq#MinTick value of held in logical queue buckets 0-63 and outputs a branchMin# value indicating the identity of the logical queue bucket in the first group of 64 logical queue buckets which holds the minimum Lq#MinTick value. Similarly, the second Bin level MIN block outputs a branchMinTick value equal to the minimum Lq#MinTick value of held in logical queue buckets 64-127 and outputs a branchMin# value indicating the identity of the logical queue bucket in the second group of 64 logical queue buckets which holds the minimum Lq#MinTick value.

The root level MIN block has two inputs coupled respectively to the outputs of the first and second Bin level MIN blocks and outputs a PortMinTick value equal to the minimum value of all the 128 Lq#MinTick values and a PortMinLq# value indicating the identity of the logical queue in the group of 128 logical queue buckets that holds the minimum Lq#MinTick value.

The buckets are arranged in a binary tree structure, as shown in FIG. 4. In general, if there are N total logical queue buckets and M logical queue buckets in each adjacent group then there are L, equal to N divided by M, adjacent logical level groups. In FIG. 4, N is equal to 128, M is equal to 8, and L is equal to 16. There are L BIN level buckets since each BIN level bucket corresponds to an adjacent group in the logical level. Each BIN level adjacent group includes M BIN level buckets and there are K, equal to L divided by M, BIN level adjacent groups. In FIG. 4, L is equal to 16, M is equal to 8 and K is equal to 2. There are K port level buckets since each port level bucket corresponds to an adjacent group of BIN level buckets.

In FIG. 4 the logical level, BIN level, and Port level buckets are implemented as separate levels so that the different level buckets can be accessed in parallel.

In FIG. 4 the shaded circles order the steps involved in selecting a best logical queue within a port and will now be described. In step 1, the LogicalQ #56 bucket's tick count gets updated, which updating occurs either when that queue is being added (tick=Current globalTickCount value), or after the previously scheduled frame length is used to update the bucket nxtTickcount as described above.

In step 2, only logical queue bucket 56 and the buckets in its adjacent group (logical queue buckets 56 to 63) are accessed, and the MINIMUM tick is found. That MinTick is propagated up into BIN 7; furthermore, the logicalQ # corresponding to the MinTick is also propagated up to BIN 7. Buckets in other adjacent groups do not need to be accessed because the tick counts in bucket nodes of those groups have not been updated.

In step 3, only the adjacent BINs 0 to 7 MinTicks are compared (similar to step 2) because other adjacent groups of BINs have not been updated. The MinTick and its bin number are propagated to the branch level.

In step 4, the 2 branchMinTick values are compared, and the best branch number and its Lq#MinTick value are propagated to the root level.

Each level in the binary tree has its own memory so that all 3 level comparisons can be done in parallel. In this example, both the Logical level and Bin level MIN blocks have eight inputs and thus the worst case memory access is bounded by eight thereby reducing each scheduler cycle.

Figure 5:
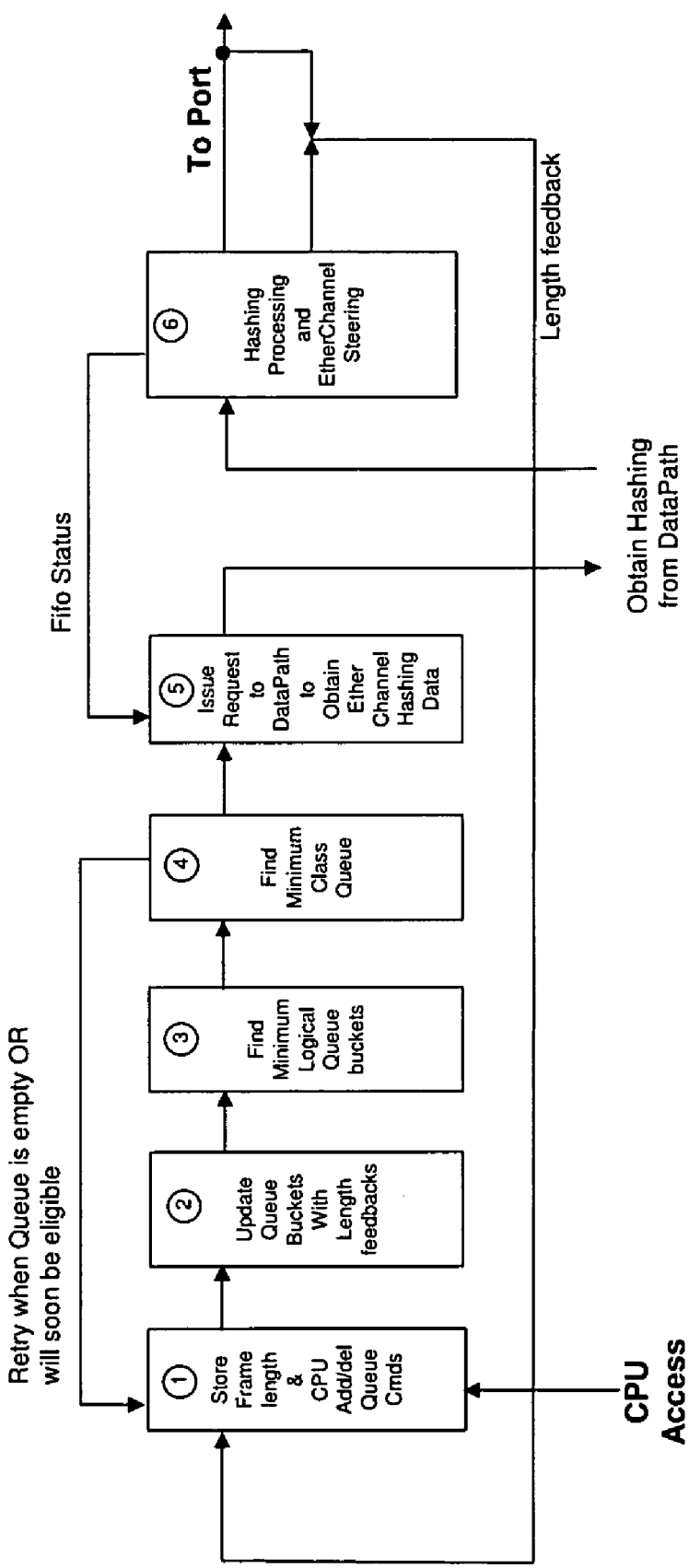
FIG. 5 illustrates an pipeline used in an example embodiment.

FIG. 5 depicts an example embodiment of a complete scheduler pipeline as implemented in an Application Specific Integrated Circuit (ASIC). In FIG. 5, the first pipeline stage receives length feedback of a transmitted frame so that the nxtTickcount can be updated and accessed by the CPU to add or delete queues.

The second pipeline stage performs the actual nxtTickcount updates, using the formula set forth in paragraph 18, based on the commands from pipeline stage 1 and the length feedback data.

The third and fourth pipeline stages traverse the binary trees at the logical queue and class queue levels.

The fifth and sixth pipeline stages are used to select a link of the EtherChannel over which to transmit a frame scheduled by the third and fourth pipeline stages. The fifth pipeline stage issues a request to the data path to obtain Etherchannel hashing information based on the MAC or IP address of the scheduled transmitting frame. The sixth pipeline stage decodes the hashing information and steers the scheduled transmitting frame to the physical port which will transmit the frame.

The fifth and sixth pipeline stages allow the actual physical port to be decoupled from the scheduler port when Etherchannel is utilized.

The invention has now been described with reference to the example embodiments. Alternatives and substitutions will now be apparent to persons of skill in the art. For example the specific number of queues or the depth of the hierarchy of queues is not a limitation on the scope of the invention. Accordingly, it is not intended to limit the invention except as provided by the appended claims.

What is claimed is:

1. A method comprising:

accessing only an updated adjacent group of first level queue buckets included in a first memory structure including N first level queue buckets each holding a token value associated with a transmission queue and with each first level queue bucket having a unique ID, with the updated adjacent group of first level queue buckets being a group of M first level queue buckets including a first level queue bucket holding a most recently updated token value, where N is a positive integer and M is a positive integer less than N and where the first level queue buckets are grouped into L first level queue adjacent groups where L is a positive integer equal to N divided by M;

propagating a first level minimum token value accessed from the updated adjacent group of first level queue buckets and a first level MIN ID value equal to a unique ID of a first level queue bucket holding the first level minimum token value;

storing the first level minimum token value and first level MIN ID in a second level bucket, associated with the updated adjacent group of first level queue buckets, included in a second memory structure including L second level buckets with a second level adjacent group being a group of M second level buckets and where the second level buckets are grouped into K second level adjacent groups where K is a positive integer equal to L divided by M;

accessing only an updated adjacent group of second level queue buckets including the second level bucket storing the first level minimum token value and the first level MIN ID;

propagating a second level minimum token value accessed from the updated adjacent group of second level queue buckets and a second level MIN ID value identifying a first level bucket holding the second level minimum token value;

storing the minimum second level token value and second level MIN ID in a third level bucket, associated with the updated adjacent group of second level queue buckets, included in a third memory structure including K third level buckets;

accessing all third level buckets; and propagating a third level minimum token value and a third level ID equal to a unique ID identifying a first level queue bucket holding the third level minimum token value so that a transmission queue associated with the third level ID can be scheduled for transmission.

2. The method of claim 1 where the token value is a tick count value and where:

the step of propagating a first minimum token value comprises propagating a first minimum tick count value;

the step of propagating a second minimum token value comprises propagating a second minimum tick count value; and the step of propagating a third minimum token value comprises propagating a third minimum tick count value.

3. The method of claim 2 further comprising the step of:

updating the tick count value held in a scheduled first level bucket identified by the third level ID after transmission of a packet from a transmission queue associated with the scheduled first level bucket.

4. The method of claim 1 further comprising:

requesting a hash value based on address data included in a frame scheduled to be transmitted from a scheduled queue; and utilizing the hash value to assign a physical link to transmit the frame.

5. The method of claim 1 where N is equal to 128 and M is equal to 8.

6. A system comprising:

a first memory level including N first level memory buckets, where N is a positive integer and where each first level memory bucket holds a token and where each first level memory bucket is identified by an ID;

a second memory level including L second level memory buckets, where L is a positive integer and where each second level memory bucket holds a token and an ID;

a third memory level including K third level memory buckets where K is a positive integer and where each third level memory bucket holds a token and an ID;

L first level logic elements having M inputs and a single output where M is a positive integer and L is equal to N divided by M, with each input of a first level logic element coupled to a unique first level memory bucket and the output coupled to a second level memory bucket;

K second level logic elements having M inputs and a single output where K is equal to L divided by M, with each input of a first level logic element coupled to a unique second level memory bucket and the output coupled to a third level memory bucket;

a single third level logic element having K inputs and a single output, with each input coupled to a third level memory bucket and the output for providing a minimum token value and an ID of a first level bucket holding the minimum token value;

with each logic element outputting the minimum token value stored in a memory bucket coupled to any of its inputs and an ID of the first level bucket holding the minimum token value which is output.

7. The system of claim 6 where the token is a tick count value and with each logic element outputting a minimum tick count value held in a bucket coupled to one of its inputs.

8. The system of claim 6 where N is equal to 128 and M is equal to 8.

9. A system comprising:

means for accessing only an updated adjacent group of first level queue buckets included in a first memory structure including N first level queue buckets each holding a token value associated with a transmission queue and with each first level queue bucket having a unique ID, with the updated adjacent group of first level queue buckets being a group of M first level queue buckets including a first level queue bucket holding a most recently updated token value, where N is a positive integer and M is a positive integer less than N and where the first level queue buckets are grouped into L first level queue adjacent groups where L is a positive integer equal to N divided by M;

means for propagating a first level minimum token value accessed from the updated adjacent group of first level queue buckets and a first level MIN ID value equal to a unique ID of a first level queue bucket holding the first level minimum token value;

means for storing the first level minimum token value and first level MIN ID in a second level bucket, associated with the updated adjacent group of first level queue buckets, included in a second memory structure including L second level buckets with a second level adjacent group being a group of M second level buckets and where the second level buckets are grouped into K second level adjacent groups where K is a positive integer equal to L divided by M;

means for accessing only an updated adjacent group of second level queue buckets including the second level bucket storing the first level minimum token value and the first level MIN ID;

means for propagating a second level minimum token value accessed from the updated adjacent group of second level queue buckets and a second level MIN ID value identifying a first level bucket holding the second level minimum token value;

means for storing the minimum second level token value and second level MIN ID in a third level bucket, associated with the updated adjacent group of second level queue buckets, included in a third memory structure including K third level buckets;

means for accessing all third level buckets; and means for propagating a third level minimum token value and a third level ID equal to a unique ID identifying a first level queue bucket holding the third level minimum token value so that a transmission queue associated with the third level ID can be scheduled for transmission.

10. The system of claim 9 where the token value is a tick count value and where:

the means for propagating a first minimum token value further comprises means for propagating a first minimum tick count value;

the means for propagating a second minimum token value further comprises means for propagating a second minimum tick count value;

the means for propagating a third minimum token value further comprises means for propagating a third minimum tick count value.

11. The system of claim 10 further comprising:

means for updating the tick count value held in a scheduled first level bucket identified by the third level ID after transmission of a packet from a transmission queue associated with the scheduled first level bucket.

12. The system of claim 9 further comprising:

means for requesting a hash value based on address data included in a frame scheduled to be transmitted from a scheduled queue; and means for utilizing the hash value to assign a physical link to transmit the frame.

13. The system of claim 9 where N is equal to 128 and M is equal to 8.

* * * * *